United States Patent
Lavado et al.

(10) Patent No.: US 9,857,260 B2
(45) Date of Patent: *Jan. 2, 2018

(54) PRESSURE TRANSDUCER WITH MULTIPLE JOINABLE PORTIONS

(71) Applicant: Sensata Technologies, Inc., Attlelboro, MA (US)

(72) Inventors: Michael J. Lavado, Griswold, CT (US); Mark C. Carlos, Lincoln, RI (US); Jan klein Bluemink, Neede (NL)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 79 days.

This patent is subject to a terminal disclaimer.

(21) Appl. No.: 14/694,044

(22) Filed: Apr. 23, 2015

(65) Prior Publication Data
US 2016/0265997 A1    Sep. 15, 2016

Related U.S. Application Data

(60) Provisional application No. 62/132,171, filed on Mar. 12, 2015.

(51) Int. Cl.
*G01L 9/12* (2006.01)
*G01L 9/00* (2006.01)
*G01L 19/14* (2006.01)

(52) U.S. Cl.
CPC .......... *G01L 9/0075* (2013.01); *G01L 19/143* (2013.01)

(58) Field of Classification Search
None
See application file for complete search history.

(56) References Cited

U.S. PATENT DOCUMENTS

| | | | |
|---|---|---|---|
| 4,888,662 A * | 12/1989 | Bishop | G01L 19/143 361/283.1 |
| 4,903,164 A | 2/1990 | Bishop et al. | |
| 5,284,107 A * | 2/1994 | Milne | E02D 33/00 116/212 |
| 5,331,857 A * | 7/1994 | Levine | G01L 9/0052 73/706 |
| 5,349,865 A * | 9/1994 | Kavli | G01L 19/14 361/283.4 |
| 5,869,766 A * | 2/1999 | Cucci | G01L 9/0075 73/706 |
| RE38,557 E * | 7/2004 | Englund | 73/706 |

(Continued)

FOREIGN PATENT DOCUMENTS

EP    403256 A  *  3/1994 ........... G01L 9/0075

OTHER PUBLICATIONS

European Search Report for European Patent Application No. 16157200.3 dated Aug. 22, 2016, 7 pages.

*Primary Examiner* — Andre Allen
(74) *Attorney, Agent, or Firm* — Burns & Levinson LLP; Joseph M. Maraia; Daniel J. McGrath

(57) ABSTRACT

In an embodiment, a pressure transducer includes a first portion, a second portion, and a third portion. The third portion is positioned in a cavity contained in the second portion. In addition, a seal is placed in the cavity. The first portion and second include provisions for applying a downward pressure on the third portion when the first portion and the second portion are joined. The downward pressure is applied by the third portion to the seal to seal the cavity.

10 Claims, 9 Drawing Sheets

(56) References Cited

U.S. PATENT DOCUMENTS

| | | | |
|---|---|---|---|
| 7,032,456 B1 * | 4/2006 | Amin | G01L 19/0092 |
| | | | 73/754 |
| 2014/0338448 A1 | 11/2014 | Ashino | |
| 2016/0265998 A1 * | 9/2016 | Lavado | G01L 9/0075 |

* cited by examiner

PRESSURE TRANSDUCER WITH MULTIPLE JOINABLE PORTIONS

RELATED APPLICATIONS

This application claims priority to and the benefit of U.S. Provisional Patent Application No. 62/132,171 that was filed on Mar. 12, 2015 and which is titled "PRESSURE TRANSDUCER", the contents of which are incorporated by reference as though fully set forth herein.

BACKGROUND

A pressure transducer is a device that measures pressure. The pressure measured by a pressure transducer is often output by the pressure transducer in the form of a signal such as, an electrical signal. For example, some pressure transducers employ strain gauges that are wired into wheatstone bridge configurations and bonded to a diaphragm. Here, pressure applied to a pressure transducer produces a deflection of the diaphragm which introduces strain to the gages. The strain to the gauges produce an electrical resistance change in the gauges proportional to the pressure. This electrical resistance change is often output from the pressure transducer in the form of an analog electrical signal.

Some pressure transducers are assembled using parts that are crimped. For example, some pressure transducers use metal components that are crimped during the assembly of the pressure transducers. Here, the crimp may be used to set a position of a seal that is employed by the pressure transducer to prevent contaminants from entering the pressure transducer. Crimping one or more components during the assembly of a pressure transducer often adds to the cost and/or complexity of assembling the pressure transducer.

BRIEF DESCRIPTION OF THE DRAWINGS

The accompanying drawings, which are incorporated in and constitute a part of this specification, illustrate one or more embodiments described herein and, together with the description, explain these embodiments. The components of the drawings are not necessarily drawn to scale, the emphasis instead being placed upon illustrating principles of the present disclosure. In the drawings.

DETAILED DESCRIPTION

Features described herein may be used, for example, in the manufacture of pressure transducers. The pressure transducers may be used in a myriad of applications. For example, the pressure transducers may be used to measure oil pressure in an automobile or boiler pressure in a boiler.

In an embodiment, a pressure transducer includes a first portion, a second portion, and a third portion. The first portion includes provisions for accommodating a connector that may electrically connect the pressure transducer to an external device (e.g., a computer). The first portion also includes provisions for joining with the second portion during an assembly of the pressure transducer. Moreover, the first portion includes provisions for seating the third portion such that the third portion compresses a seal that is used to seal the third portion from contaminants that may be external to the pressure transducer.

The second portion includes provisions for joining with the first portion without requiring a crimp operation. Moreover, the second portion includes provisions for accommodating the third portion and the seal. In addition, the second portion includes provisions for providing pressure to be measured by the pressure sensor to a sensing element contained in the pressure sensor. The second portion also includes provisions for mounting the pressure sensor.

The third portion includes provisions for measuring pressure and generating a signal based on the measured pressure. The generated signal includes an electronic signal that represents the measured pressure.

Figure 1A:
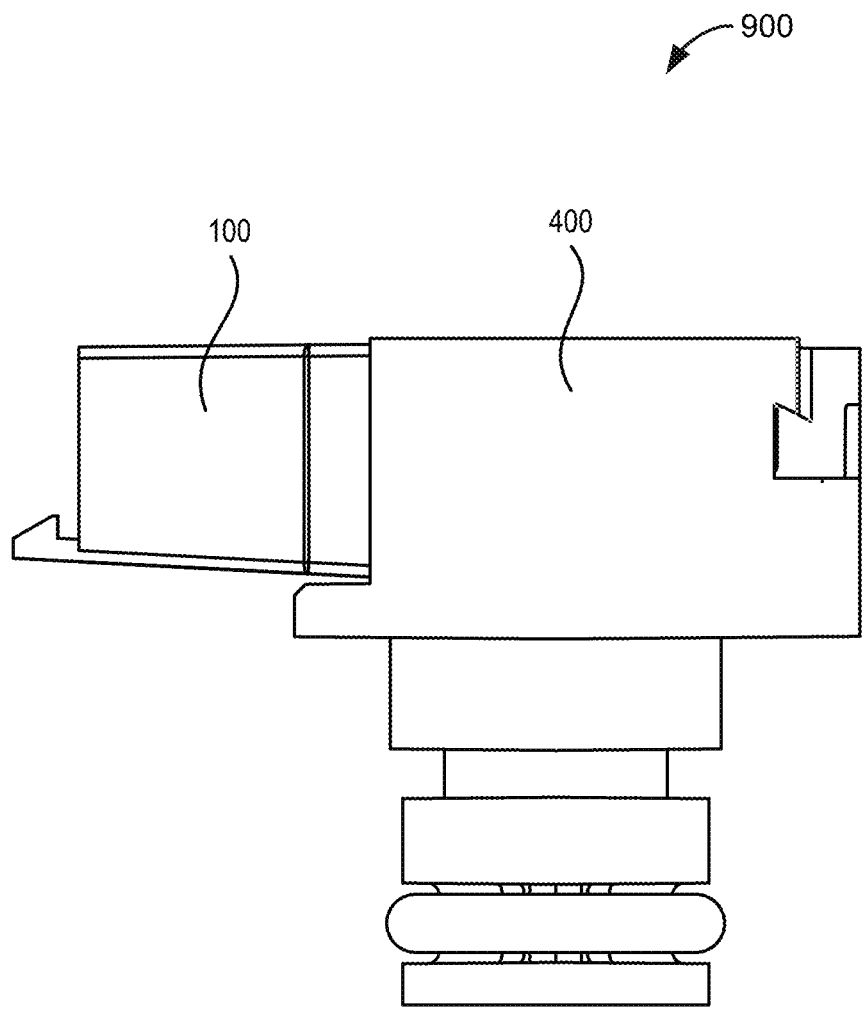
FIG. 1A illustrates an example embodiment of a pressure transducer.

FIG. 1A illustrates an example embodiment of a pressure transducer 900. The pressure transducer 900 includes a first portion 100 and a second portion 400. As will be described further below, the first portion 100 includes, inter alia, provisions to accommodate a connector that may be connected to the pressure transducer 900. The connector may carry a signal generated by the pressure transducer 900 to an external device such as, for example, a computer.

Also, as will be described further below, the second portion 400 includes, inter alia, provisions to accommodate seating of a third portion of the pressure transducer 900. In an embodiment, the third portion is an electronic module assembly (EMA) that contains electronic components (e.g., integrated circuits, resistors, capacitors, sense element) for measuring a pressure that is introduced into a channel contained in the pressure transducer 900. The third portion is seated against a seal contained in the pressure transducer 900.

Figure 1B:
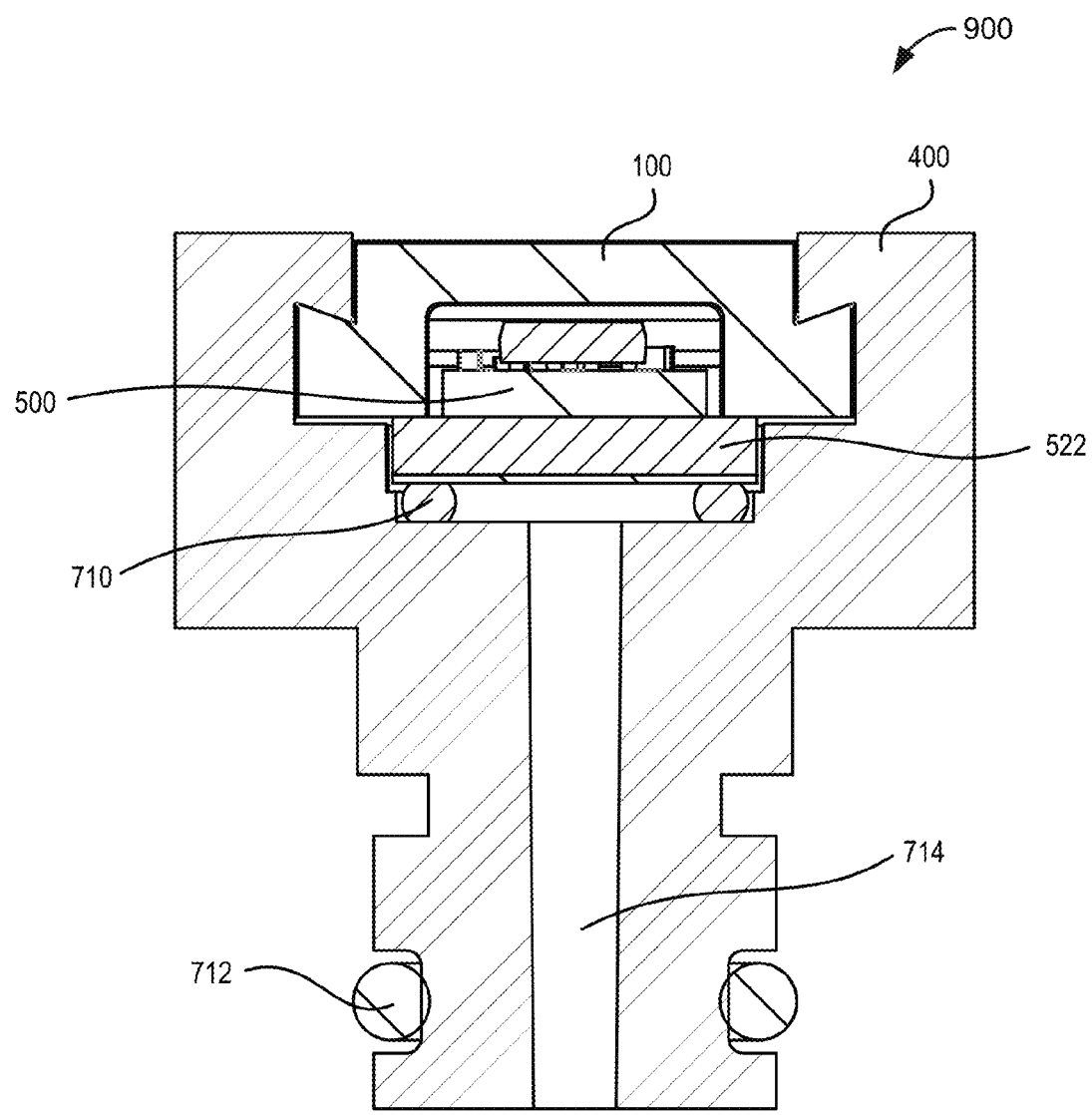
FIG. 1B illustrates an example cross-sectional view of the pressure transducer.

FIG. 1B illustrates an example cross-sectional view of the pressure transducer 900. Referring to FIG. 1B, an example placement of the first portion 100, the second portion 400, and the third portion 500 in the pressure transducer 900 is illustrated. Note that in this example placement, the first portion 100 (1) makes contact with the third portion 500 and (2) provides a downward pressure on the third portion 500. This downward pressure is applied to seal 710 by the third portion 500. The seal 710 may be, for example, an O-ring seal. The downward pressure compresses seal 710. The compressed seal 710 acts to seal the third portion 500 from contaminates (e.g., dirt, metal fragments) that may enter the pressure transducer 900 via channel 714 and potentially affect an operation of the third portion 500.

Channel 714 allows pressure from outside the pressure transducer 900 to enter the pressure transducer 900. This pressure is applied to a sense element (described further below) which in this embodiment is part of the third portion 500. Also note that the pressure transducer 900 contains a mounting seal 712 that acts to provide a seal for the pressure transducer 900 when the pressure transducer 900 is mounted to a device (e.g., an engine, a boiler). The mounting seal 712 may be, for example, an O-ring seal.

Figure 2:
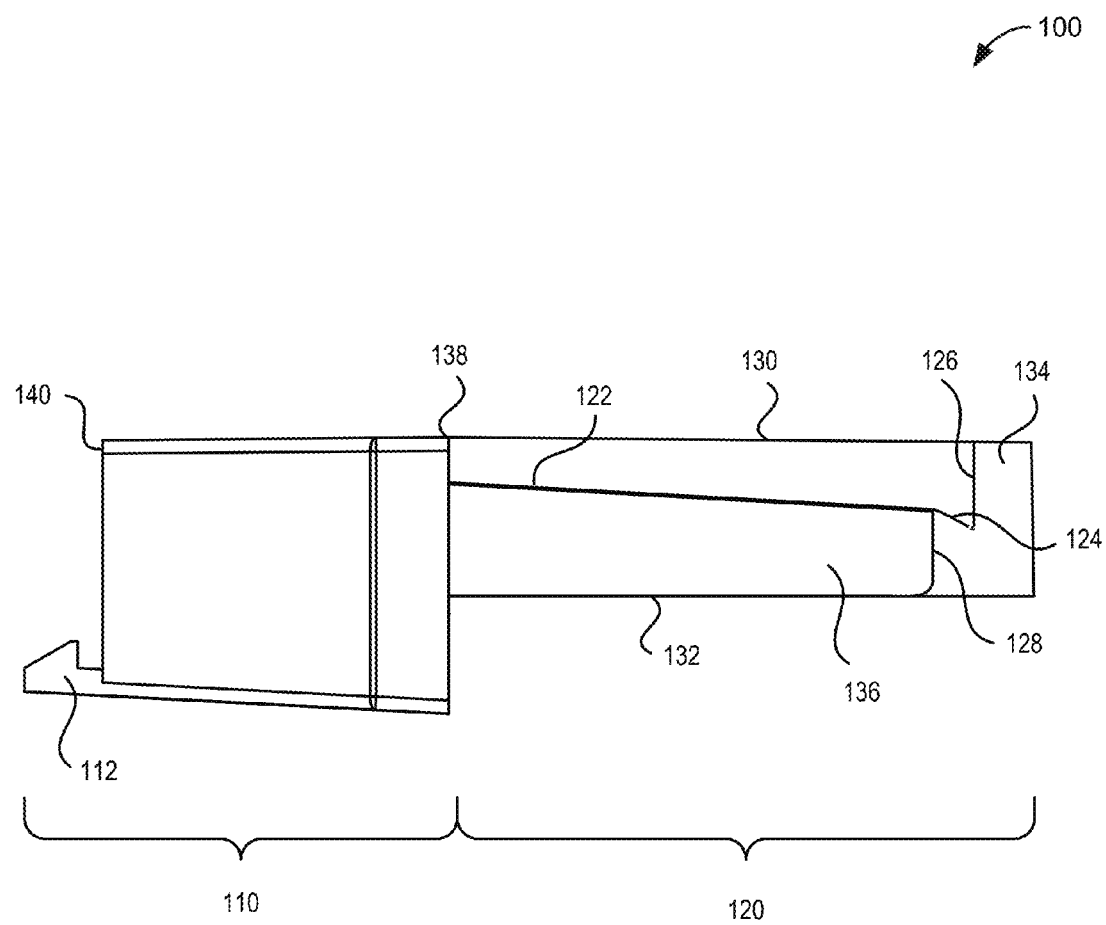
FIG. 2 illustrates a first view of an example embodiment of a first portion of the pressure transducer.

FIG. 2 illustrates a first view of an example embodiment of the first portion 100. Referring to FIG. 2, the first portion 100 includes a connector section 110 and a keyed section 120.

The connector section 110 is at a connector end 140 of the first portion 100. The connector section 110 accommodates a connection between the pressure transducer 900 and the external device. The connection may be an electrical connection that may enable electrical signals (e.g., analog signals, digital signals) generated by the pressure transducer 900 to be transferred between the pressure transducer 900 and the external device. The connector section 110 includes a locking mechanism 112 (e.g., a clip) that may be used to secure the connection.

The keyed section 120 includes provisions to accommodate joining the first portion 100 with the second portion 400. Moreover, the first portion 100 includes provisions for seating the third portion 500 in the second portion 400 and against seal 710. Example embodiments of the second portion 400 and the third portion 500 will be described further below. In addition, examples techniques for (1) joining the first portion 100 with the second portion 400 and (2) seating the third portion 500 in the second portion 400 will be described further below.

The keyed section 120 includes a top surface 130, a bottom surface 132, a face 134, and a key 136. The top surface 130 and the bottom surface 132 may be flat. As will be described further below, the bottom surface 132 makes contact with the third portion 500 and provides a force (e.g., downward force) that enables the third portion 500 to be seated in the second portion 400.

Point 138 is at a first end of the keyed section 120. The first end is located at a point where the keyed section 120 meets the connector section 110. Face 134 is at a second end of the keyed section 120. The second end is opposite the first end. The face 134 is keyed to accommodate joining the first portion 100 with the second portion 400. Moreover, the face 134 is curved to follow a shape of the second portion 400.

The key 136 is formed by edges 122, 124, 126, and 128. Edge 122 is sloped downward from where the connector section 110 meets the keyed section 120 towards the face 134. In an embodiment, the slope of edge 122 is defined based on (1) accommodating the joining of the first portion 100 with the second portion 400 and (2) an amount of pressure the first portion 100 applies to the third portion 500. This pressure may include (1) a pressure that is applied by the first portion 100 to the third portion 500 when the pressure transducer 900 is assembled and (2) a pressure that is applied by the first portion 100 to the third portion 500 after the pressure transducer 900 is assembled. Note that edge 122 slopes at an angle from point 138 towards the face 134. The angle may be, for example, between 0 and 45 degrees although other angles may be used.

Edge 128 defines a first side of key 136. At a first end, edge 128 is adjacent to the bottom surface 132. At a second end (opposite the first end of edge 128), edge 128 is adjacent to a first edge 124. Edge 126 defines a second side of key 136. At a first end, edge 126 is adjacent to the top surface 130. At a second end (opposite the first end of edge 126), edge 126 is adjacent to a second end of edge 124, where the first end of edge 124 is opposite the second end of edge 124.

Edge 124 slopes downward towards edge 126. In other embodiments, edge 124 may slope upward towards edge 126 or not slope at all (e.g., edge 124 may be perpendicular with edge 126). The slope of edge 124 may be defined based on, for example, reducing lateral motion of the first portion 100 when joining the first portion 100 with the second portion 400. Note that edge 124 slopes at an angle from the edge 122 towards edge 126. The angle may be, for example, between 0 and 90 degrees although other angles may be used.

Figure 3:
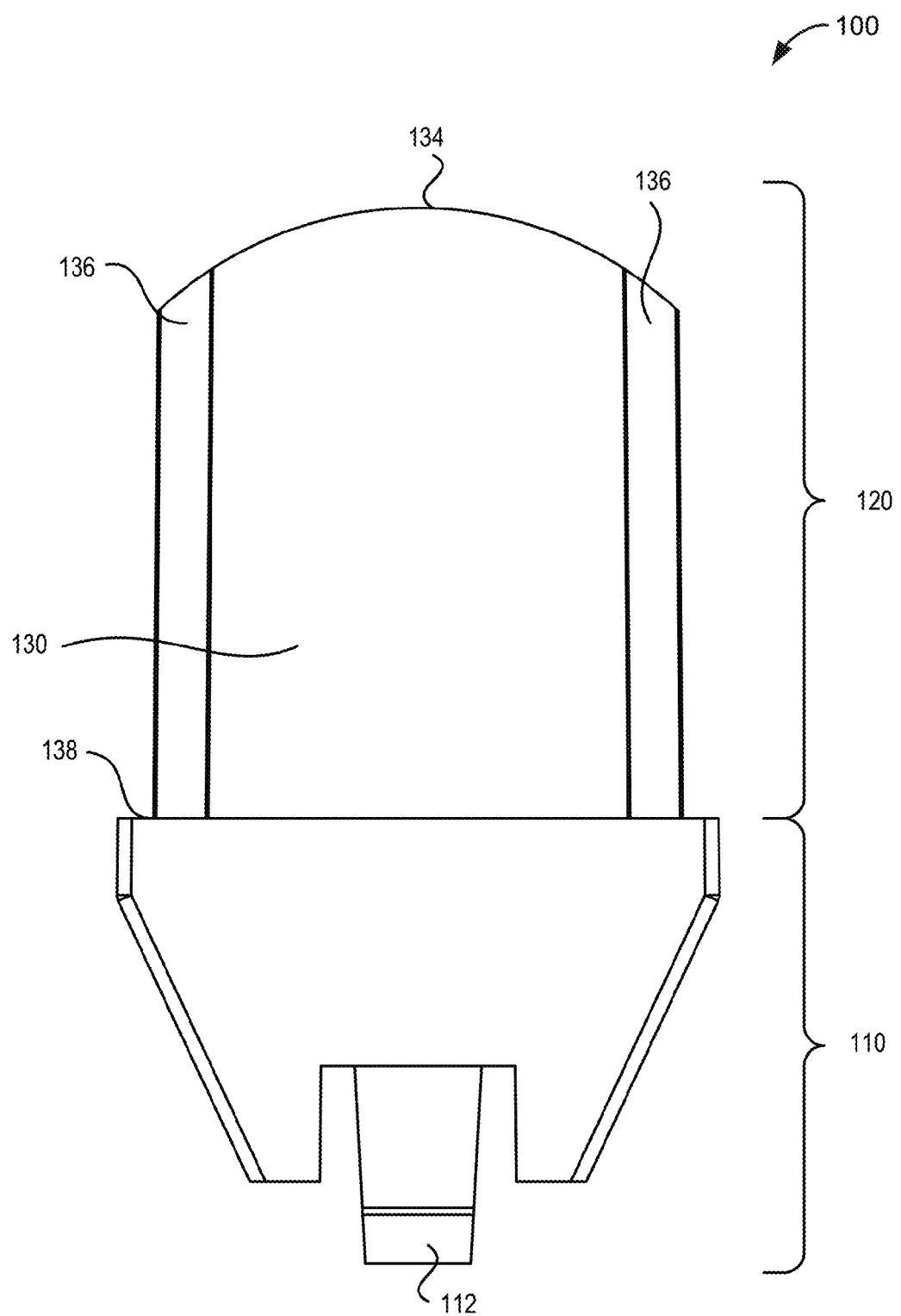
FIG. 3 illustrates a second view of the first portion.

FIG. 3 illustrates a top-down view of the first portion 100. Referring to FIG. 3, note that the top-down view shows a position of the keys 136 with respect to the top surface 130. Moreover, the top-down view shows an example curving of the face 134. In this embodiment, the curving matches a curving of the second portion 400 such that after the pressure transducer 900 is assembled, the face 134 is flush with the outer surface of the second portion 400.

In the connector section 110, the top-down view further illustrates a size and shape of the connector section 110 with respect to a size and shape of the keyed section 120. Note that the sides of the connector section 110 extend further outward than the keyed section 120. This extension enables the connector section 110 to act as a stop when the first portion 100 is joined with the second portion 400. Also note that in FIG. 3, a different perspective of locking mechanism 112 is illustrated.

Figure 4A:
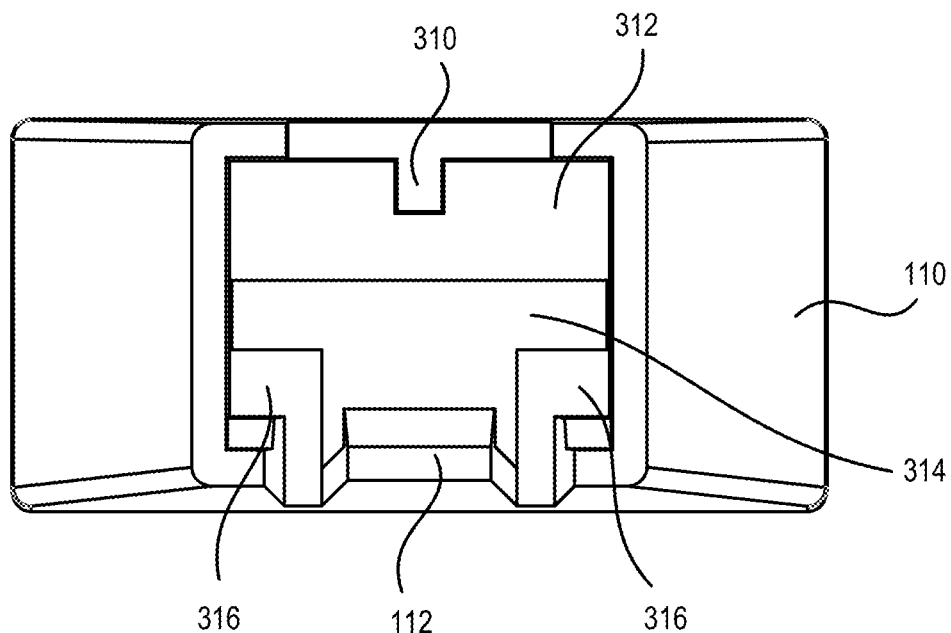
FIGS. 4A-B illustrate head-on views of the first portion.
Figure 4B:
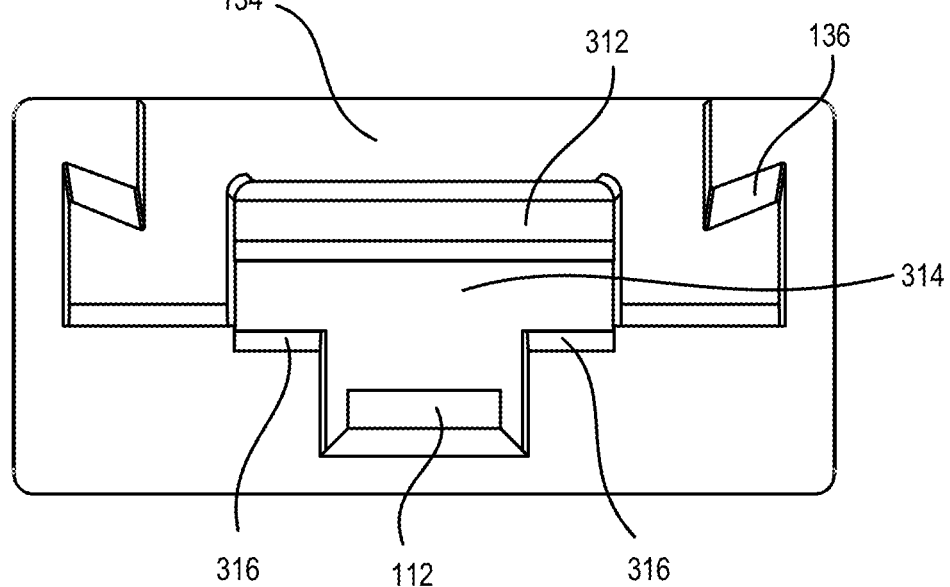

FIGS. 4A-B illustrate head-on views of the first portion 100. Specifically, FIG. 4A illustrates a head-on view looking from the connector section 110 towards the keyed section 120 and FIG. 4B illustrates a head-on view looking from the keyed section 120 towards the connector section 110.

Referring to FIGS. 4A-B, the first portion 100 includes a key 310, a stop 312, an opening 314, and pedestals 316. The key 310 acts to orient and guide a connector that may be connected to the pressure transducer 900 at the connector section 110. The connector may be secured using locking mechanism 112.

Stop 312 is used to guide and constrain a movement of the third portion 500. As will be described further below, the third portion 500 includes a circuit board. Stop 312 acts to accommodate guiding the circuit board through opening 314 as the first portion 100 is joined with the second portion 400. Moreover, after the first portion 100 is joined with the second portion 400, stop 312 acts to constrain movement of the circuit board.

Opening 314 is provided to accommodate the third portion 500. After the first portion 100 and the second portion 400 are joined, a portion of the circuit board associated with the third portion 500 passes through opening 314. That portion of the circuit board includes electrically conductive terminals which provide an electrical connection between circuitry on the circuit board and a connector connected at the connector section 110.

Pedestals 316 act to accommodate guiding the circuit board through opening 314. Moreover, pedestals 316 act to provide a resting point for the circuit board after the first portion 100 is joined with the second portion 400.

Figure 5:
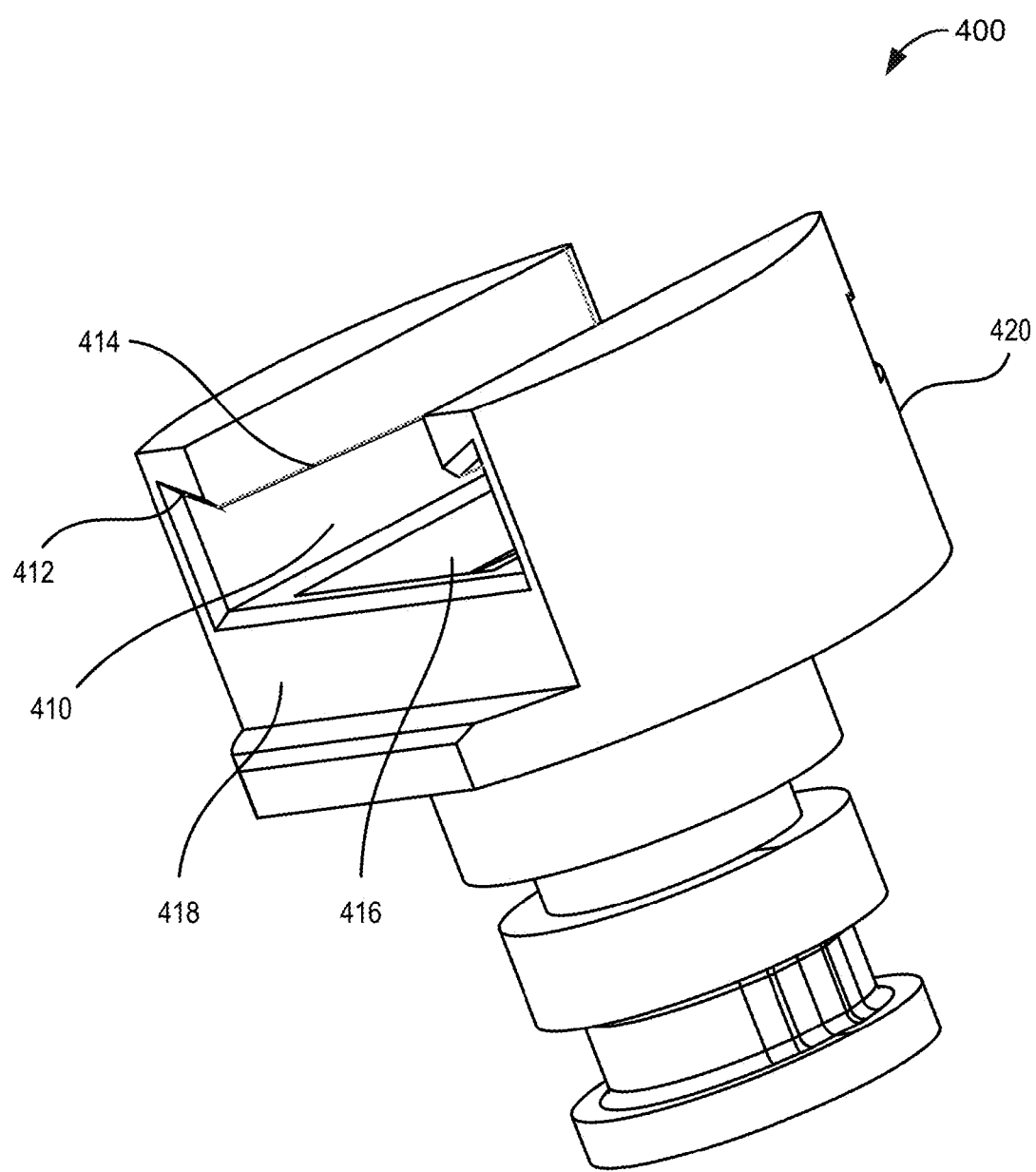
FIG. 5 illustrates an example embodiment of a second portion of the pressure transducer.

FIG. 5 illustrates an example embodiment of the second portion 400 of the pressure transducer 900. Referring to FIG. 5, the second portion 400 includes an opening 410, a cavity 416, and an edge 414.

The opening 410 is shaped to receive the first portion 100 during the assembly of the pressure transducer 900. Opening 410 includes an edge 412 which, for example, acts to align the first portion 100 with the second portion 400 during the assembly of the pressure transducer 900. For example, as will be described further below, assembling the pressure transducer 900 includes joining the first portion 100 with the second portion 400. Here, for example, edge 412 acts to align the first portion 100 with the second portion 400 as the first portion 100 is joined with the second portion 400.

Edge 414 is sloped downward from the front side 418 of the second portion 400 towards the back side 420 of the second portion 400. The front side 418 includes a point where the first portion 100 begins to join with the second portion 400. The back side 420 includes a point where the first portion 100 and the second portion 400 are completely joined.

The cavity 416 is shaped to receive the third portion 500. Moreover, cavity 416 contain provisions to accommodate seal 710, which as shown in FIG. 1B is placed in the cavity 416 between the third portion 500 and channel 714.

A slope of edge 414 may be defined based on, for example, a desired motion of the first portion 100 when joining the first portion 100 with the second portion 400. This desired motion may act to accommodate a seating of the third portion 500 in cavity 416. Seating the third portion 500 in the cavity 146 causes the third portion 500 to apply pressure to the seal 710 to, for example, compress the seal 710. Compressing seal 710 may prevent contaminants from entering the cavity 416 via channel 714.

Figure 6:
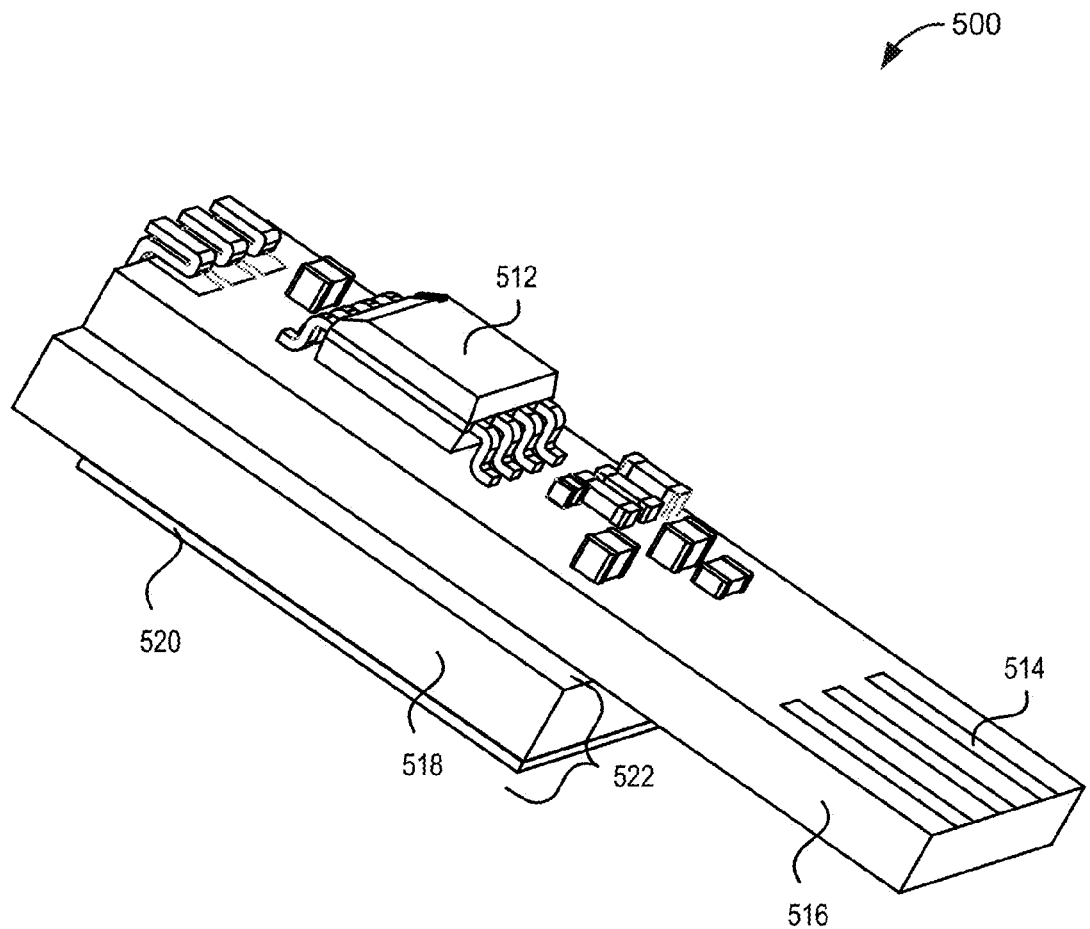
FIG. 6 illustrates an example embodiment of a third portion of the pressure transducer.

FIG. 6 illustrates an example embodiment of the third portion 500 of the pressure transducer 900. The third portion 500 includes electronic circuitry 512, terminals 514, a circuit board 516, and a sense element 522.

Electronic circuitry 512 includes electronic components (e.g., integrated circuits, resistors, capacitors) for receiving a reading (e.g., capacitance value) from the sense element 522 and generating a signal based on the reading. The electronic components are mounted on circuit board 516. The terminals 514 are electrically conductive connections that transfer the signal generated by the electronic circuitry 512 to an external device connected to the pressure transducer 900.

Sense element 522 includes a ceramic substrate 518 and a ceramic diaphragm 520. Ceramic substrate 518 is a substrate for the ceramic diaphragm. Ceramic substrate 518 is rigid and provides a platform for the ceramic diaphragm 520. The ceramic diaphragm 520 is a diaphragm for the sense element 522. Ceramic diaphragm 520 flexes based on a pressure applied to the ceramic diaphragm 520. A capacitance associated with the sense element 522 varies based on a flexing of the ceramic diaphragm 520.

Operationally, pressure is introduced into the pressure transducer 900 via channel 714 (FIG. 1B) and applied to the sense element 522. The pressure causes the ceramic diaphragm 520 to flex. A capacitance of the sense element 522 varies based on the flexing of the ceramic diaphragm 520. The capacitance is read and processed by the electronic circuitry 512 which produces a signal based on the capacitance. The signal is transferred via terminals 514 from the third portion 500 to an external device connected to the pressure transducer 900.

Figure 7A:
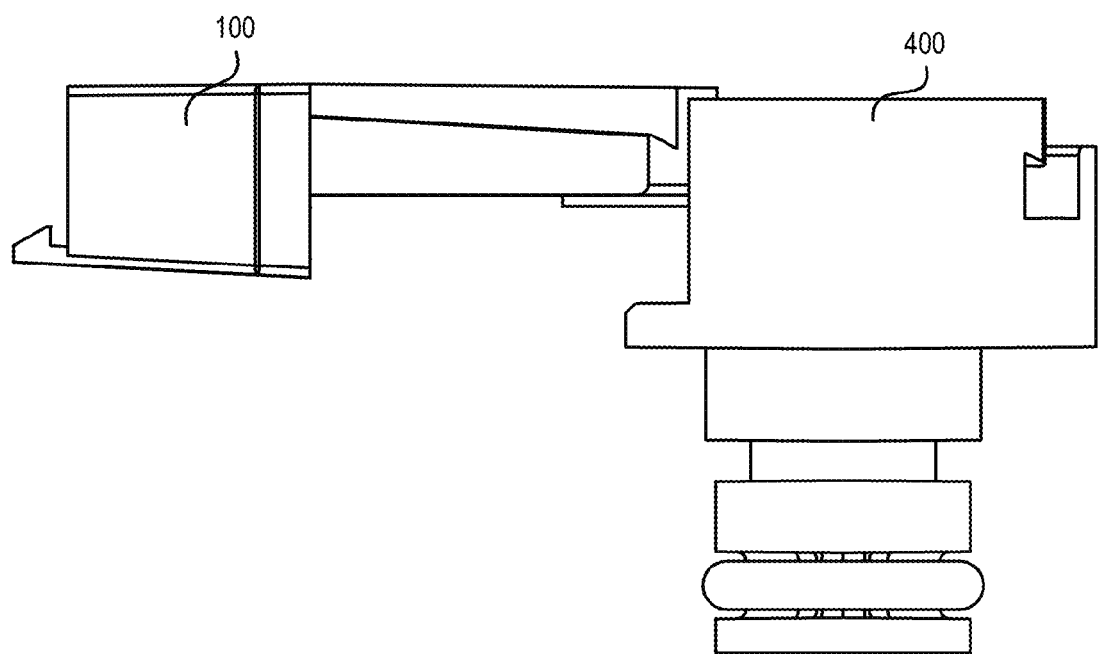
FIGS. 7A-B illustrate an example technique for assembling the pressure transducer.
Figure 7B:
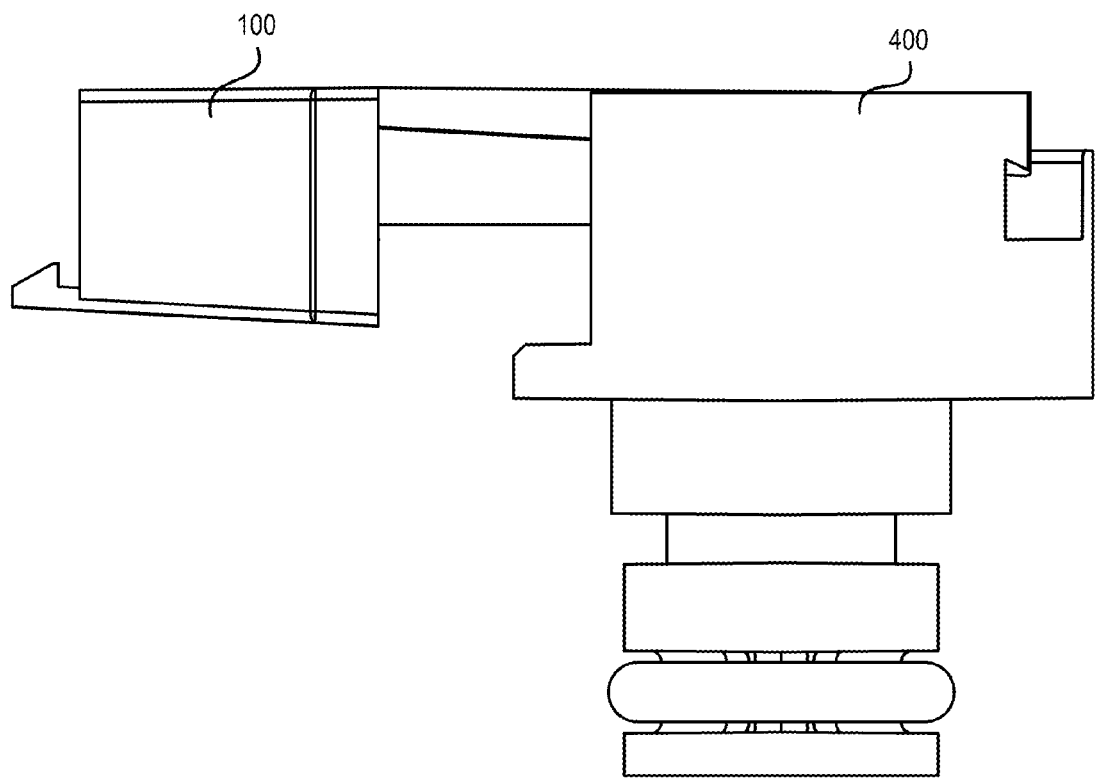

FIGS. 7A-B illustrate an example technique for assembling the pressure transducer 900. Referring to FIGS. 7A-B, seal 710 (FIG. 1B) and the third portion 500 (FIG. 6) are placed inside the cavity 416 (FIG. 5) prior to joining the first section 100 with the second section 400. The seal 710 is placed in the cavity 416 between channel 714 and the third portion 500 as shown in FIG. 1B.

The keyed section 120 enters opening 410 (FIG. 5) at the front side 418 of the second portion 400. Edges 412 and 124 act to guide and/or align the keyed section 120 in the opening 410. As the keyed section 120 progresses into the opening 410, edges 414 and 122 act to apply a downward pressure on the keyed section 120. This downward pressure is applied to the third portion 500 and causes the third portion 500 to seat in cavity 416. Moreover, the downward pressure is transferred from the third portion 500 to seal 710 in cavity 416 and causes the seal 710 to compress. The compressed seal 710 acts to seal the cavity 416 from contaminants that may otherwise enter the cavity 416 via, for example, channel 714. An example of the assembled pressure transducer 900 is illustrated in FIG. 1A.

It should be noted that friction between the first portion 100 and second portion 400 may hold these portions 100, 400 together in the assembled pressure transducer 900. This may obviate having to utilize a crimping operation when assembling pressure transducer 900.

It should also be noted that in other embodiments, other techniques (e.g., locks, snaps) for holding portions 100 and 400 together may be used.

The foregoing description of embodiments is intended to provide illustration and description, but is not intended to be exhaustive or to limit the invention to the precise form disclosed. Modifications and variations are possible in light of the above teachings or may be acquired from practice of the invention.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It is intended that the invention not be limited to the particular embodiments disclosed above, but that the invention will include any and all particular embodiments and equivalents falling within the scope of the following appended claims.

What is claimed is:

1. A pressure transducer comprising:
   a first portion;
   a second portion that is joined with the first portion, the second portion having a cavity;
   a seal contained in the cavity; and
   a third portion contained in the cavity,
   wherein the first portion includes:
      a first edge for applying a pressure to the third portion to compress the seal;
      a connector section to accommodate connecting the pressure transducer to an external device; and
      a keyed section to accommodate joining the first portion with the second portion.

2. The pressure transducer of claim 1, wherein the keyed section includes the first edge that slopes downward from a point where the connector section meets the keyed section.

3. The pressure transducer of claim 2, wherein the first edge slopes downward at an angle between 0 and 45 degrees.

4. The pressure transducer of claim 1, wherein the keyed section includes a second edge, a third edge, and a fourth edge, and
   wherein the second edge is adjacent to a bottom surface of the keyed section and the fourth edge, the third edge is adjacent to a top surface of the keyed section and the fourth edge, and the fourth edge is adjacent to the second edge and the third edge, and
   wherein the fourth edge slopes towards the third edge.

5. The pressure transducer of the claim 4, wherein the fourth edge slopes downwards towards the third edge at an angle between 0 and 90 degrees.

6. A pressure transducer comprising:
a first portion;
a second portion that is joined with the first portion, the second portion having a cavity;
a seal contained in the cavity; and
a third portion contained in the cavity,
wherein:
the first portion includes an edge for applying a pressure to the third portion to compress the seal;
the second portion includes an opening for receiving the first portion; and
the second portion includes an edge that acts to align the first portion with the second portion during a joining of the first portion with the second portion.

7. A pressure transducer aligned along a longitudinal axis comprising:
a first portion having: a keyed member running between a first end and a second end along a transverse axis, the keyed member sloping downward with respect to the longitudinal axis; and
a second portion having: an outer housing defining an opening for receiving the first portion along the transverse axis, the outer housing having an inner edge running along the transverse axis and sloping downward with respect to the longitudinal axis from a front side to a back side; and a cavity within the opening fluidly connected to a pressure channel;
a third portion seated within the cavity, the third portion having a diaphragm exposed to the pressure channel; and
a seal disposed between the second portion and the third portion,
wherein when the opening of the second portion receives the first portion, the inner edge applies force to the keyed member in the direction of the longitudinal axis causing the first portion to press the third portion against the seal, thereby sealing the third portion to the pressure channel.

8. The pressure transducer of claim 7, wherein the first portion also includes a connector section coupled to the keyed member.

9. The pressure transducer of claim 7 wherein the downward slope of the keyed member is between 0 and 45 degrees.

10. The pressure transducer of claim 7 wherein the downward slope of the inner edge is between 0 and 45 degrees.

* * * * *